3,029,274
ALKAMINE ESTERS OF AMINO SALICYLIC ACID

Walter Grimme, Uffort, Moers, and Heinrich Schmitz, Moers-Meerbeck, Germany, assignors to Rheinpreussen Aktiengesellschaft für Bergbau und Chemie, Homberg, Lower Rhine, Germany, a corporation of Germany
No Drawing. Filed May 23, 1955, Ser. No. 510,535
In Germany Oct. 22, 1949
2 Claims. (Cl. 260—472)
Public Law 619, Aug. 23, 1954
Patent expires Oct. 22, 1969

This invention relates to alkamine esters of paramino salicylic acid.

One object of the invention are novel alkamine esters of para-amino salicylic acid, which have been found to constitute valuable pharmaceutical products exhibiting outstanding local anaesthetic properties.

The foregoing and further objects of the invention will be understood from the following description:

The novel esters, in accordance with the invention, have the general formula

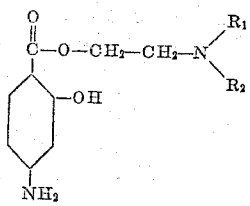

in which $R_1$ and $R_2$ are lower alkyl radicals having up to 4 carbon atoms. Further, $R_1$ and $R_2$ taken together with —N may be in the form of a piperidino or a morpholino radical.

The preferred compounds, in accordance with the invention, are the diethylaminoethylester and dimethylaminoethylester of para-amino salicylic acid.

The novel esters, in accordance with the invention, may be formed by direct esterification in the presence of a large excess of a strong, inorganic acid such as concentrated sulfuric acid or an aryl sulfonic acid such as p-toluene sulfonic acid. The amount of acid must be so large that during the esterification under formation of water not more than one mol of water is formed per mol of the acid used. The esterification is merely effected by heating the para-amino salicylic acid with the desired N-substituted amino alcohol in the presence of the excess of the acid. Due to the presence of the excess acid, the conventional decomposition of the para-amino salicylic acid to carbon dioxide and meta-amino phenol is avoided and the desired esters are produced in relatively large yields. The N-substituted amino alcohols may be any N-substituted amino alcohol corresponding to the alcoholic portion of the ester in the general formula.

Instead of direct esterification of the para-amino salicylic acid with an amino alcohol, the para-amino salicylic acid may first of all be esterified with a halogenated alcohol as, for example, ethylenechlorhydrin and the halogen alkyl ester produced thereupon reacted with an aliphatic amine as, for example, diethylamine.

Though it would generally be expected that when reacting the para-amino salicylic acid with the halogenated alcohols, that the amino group of the para-amino salicylic acid would also react with the halogen of the alcohol, very surprisingly this undesirable side reaction does not occur. Further, it would be generally expected that the halogenated alcohol would form an ether with the phenolic hydroxy group, splitting off hydrogen halide. These side reactions, however, do not occur and the esterification of the carboxyl group with the halogenated alcohol occurs smoothly. In this reaction, it is also necessary to use a large excess of concentrated sulfuric acid or of another strong inorganic acid or aryl sulfonic acid in the same range as indicated above. The reaction of the halogen alkyl ester of the para-amino salicylic acid which is obtained in this manner with an aliphatic amine in order to prepare the esters in accordance with the invention, also takes place readily.

The novel esters, in accordance with the invention, may also be prepared by reacting in place of the free para-amino salicylic acid, a salt of the para-amino salicylic acid with a halogenated aliphatic amine. Thus, for example, sodium 2-hydroxy-4-amino benzoate may be reacted with β-diethylamino-ethylchloride

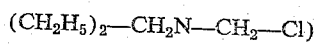

in the presence of an anhydrous solvent and the β-diethylaminoethyl ester of para-amino salicylic acid will be formed in good yield. As anhydrous solvents may be used anhydrous alcohols, such as anhydrous isopropyl alcohol or secondary butyl alcohol; ketones, such as acetone, methyl-ethyl-ketone, diethylketone or di-isopropyl-ketone; esters, such as diethylacetate or dipropylacetate; or any other anhydrous solvent which is indifferent to the reactants and has sufficient solubility for the salts of the para-amino salicylic acid.

It was further found that these esters can also be prepared by an interchange of ester radicals. Thus, instead of the free para-amino salicylic acid, there can be used as starting substance their low molecular esters such as the methyl- or ethylesters, which then, upon reaction with an N-substituted amino alcohol, give good yields of the desired esters of the para-amino salicylic acid with N-substituted amino alcohols.

The aforenamed reactions take place at elevated temperatures of nearly 50° C. till to about 120° C.; in general the reactions are terminated within several hours.

The following examples are given by way of illustration and not limitation:

EXAMPLE 1

A mixture of 10 grams p-aminosalicylic acid with 50 cc. concentrated sulfonic acid to which 20 grams β-diethylaminoethanol had been added in separate portions while cooling with ice, is heated at 100 to 110° C. for eight hours. The reaction mixture is poured onto ice, and alkalized with alkali carbonate, the ester is isolated by extraction with ether, acetic ester or chloroform. There are obtained 5.6 grams of ester in the form of a light yellow oil (yield about 33%) which can be purified via the picrates (melting point 198° C.) after its decomposition in the hot with soda solution.

EXAMPLE 2

A mixture of 20 grams p-amino salicyclic acid with 80 cc. concentrated sulfuric acid to which 65 grams di-n-butylaminoethanol had been added in separate portions while cooling with ice, is heated on the water-bath for 8 hours. The reaction mixture is further treated as in Example 1. There are obtained 20.5 grams of ester. Its hydrochloride melts at 201° C. (decomposition).

EXAMPLE 3

In the same manner as described in Example 1, there are obtained by reacting 20 grams para-amino salicyclic acid with 80 cc. concentrated sulfuric acid and 20 grams beta-N-morpholinoethanol 13 grams of ester. After recrystallization from water, the ester is obtained in the form of the monohydrate of the melting point 89–91° C. The water-free ester melts at 64–66° C. Its hydrochloride melts at 235–237° C. (under decomposition).

EXAMPLE 4

Preparation of the Halogen Alkyl Ester 100 grams p-aminosalicyclic acid are dissolved in 500 cc. of ethylenechlorhydrin and, after the addition of 200 cc. concentrated sulfuric acid, heated at 100° C. for 8 to 10 hours. The excess ethylene-chlorhydrin is distilled off in a vacuum ($BP_{12}=36°$ C.). The remaining oil is poured into 2 liters of ice water; the solution is made alkaline with potassium carbonate and the β-chlorethyl ester is extracted with chloroform. The yield is 100 grams or 71% of the theoretical yield. The melting point of the ester is 121 to 122° C.

EXAMPLE 5

Reaction of the Halogen Alkyl Ester With an Amine To Form the Ester of Hydroxyaminobenzoic Acid 50 grams β-chlorethylester of p-aminosalicyclic acid are suspended in 200 cc. benzene and reacted in an autoclave with 60 grams diethylamine for 10 hours at 110° C. The reaction mixture is freed from benzene by evaporation in a vacuum; the oily residue is dissolved in water and concentrated hydrochloric acid is added to the aqueous suspension until it gives a clear acid reaction to Congo red. By extraction with chloroform or ether, unreacted portions of the β-chloroethyl ester used are removed. After making alkaline with potassium carbonate, the β-diethyl-aminoethylester of p-amino-salicyclic acid formed is liberated and isolated by means of chloroform. Upon evaporation, there are obtained 43 grams crude ester in the form of a claret oil; yield 73%. The hydrochloride constitutes white crystals (from ethyl alcohol) of a melting point of 154 to 155° C.

EXAMPLE 6

50 grams of β-chloroethylester of 2-hydroxy-4-aminobenzoic acid are heated for 12 hours in an autoclave at 120° C. together with 45 grams piperidine in 200 cc. benzene. The reaction material is shaken with dilute hydrochloric acid, a large part of the (β-piperidino) ethyl ester of 2-hydroxy-4-aminobenzoic acid formed precipitating in crystalline form as the hydrochloride. This salt is isolated and recrystallized from water, there being obtained colorless needles of a melting point of 226 to 227° (2decomposition) in a quantity of 13 grams.

The main portion of the ester formed is obtained in the form of an oil from the mother liquors by extraction with benzene after alkalization with potash.

The said oil forms the aforedescribed hydrochloride which is only difficulty soluble in water upon treatment with dilute hydrochloric acid.

The hydrochloride has the formula:

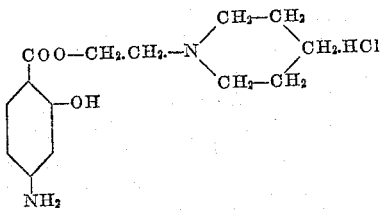

EXAMPLE 7

15 grams anhydrous 2-hydroxy-4-amino-sodium benzoate, 6.8 grams 1-chloro-2-diethylaminoethane and 200 cc. anhydrous isopropylalcohol are heated while stirring to 80 to 90° C. for 24 hours. The sodium chloride produced in the reaction is filtered away and the solution is concentrated by evaporation in a vacuum, whereupon the residue is dissolved in chloroform, the solution filtered again and then evaporated in a vacuum. As residue, there remain 10 grams (β - diethylamino) - ethyl-2-hydroxy-4-aminobenzoate. The hydrochloride melts at 153° C.

EXAMPLE 8

30 grams sodium 2-hydroxy-4-aminobenzoate (anhydrous) are added to 300 cc. absolute ethyl alcohol and the mixture is heated to the boiling point. Thereupon a solution of 24 grams 1-chloro-2-piperidinoethane in 50 cc. absolute ethyl alcohol is added, drop by drop, over the course of 2 hours and the mixture is heated for a further 6 hours at the boiling point. After filtration, the alcoholic solution is concentrated by evaporation and the oily residue is stirred with dilute hydrochloric acid. The hydrochloride of the β-piperidinoethylester of 2-hydroxy-4-aminobenzoic acid formed is recrystallized from water in order to purify it. Melting point: 227° C. (decomposition). The yield is 40.1 grams (80% of the theoretical yield).

EXAMPLE 9

77 grams 2-hydroxy-4-aminobenzoic acid were added while stirring to an alcoholate solution of 11.5 grams sodium in 1000 cc. isopropyl alcohol. The mixture was heated on 60–70° C. and thereupon 54 grams of 1-chloro-2-dimethylaminoethane $Cl-CH_2-CH_2-N(CH_3)_2$ were introduced, drop by drop, over the course of 3 to 4 hours. After stirring and heating for another 2 hours, the sodium chloride formed was removed by suction filtering and the solution was boiled down. The oily residue crystallizes after some hours and is recrystailized from isopropyl alcohol. There are obtained colorless needles of the melting point 138° C. in an amount of 85 grams (i.e. 75% of the theoretical yield). The hydrochloride of the ester, after re-crystallization from isopropyl alcohol, forms needles of the melting point 218° C. (decomposition).

EXAMPLE 10

30 grams of methyl 2-hydroxy-4-aminobenzoate and 100 grams β-diethylaminoethanol are heated for 20 hours at 130 to 135° C. After the excess β-diethylaminoethanol has been distilled off in a vacuum, the oily solid residue is dissolved in water, the solution is acidified with acetic acid and repeatedly extracted with ether in order to remove the last traces of β-diethylaminoethanol. The acetic-acid solution is made alkaline with potassium carbonate and the β-diethylaminoethyl ester of 2-hydroxy-4-aminobenzoic acid formed is isolated by means of chloroform. After the chloroform has been distilled off, there remain 5 grams of this ester in the form of a light yellow oil. The melting point of the picrate is 198° C.

In actual clinical tests the compounds were found to constitute extremely active local anaesthetics which had extremely low toxicity.

Certain esters of 4-amino-2-hydroxybenzoic acid with N-substituted amino-alcohols, in particular the 4-amino-2-hydroxybenzoic acid-β-diethylaminoethyl ester, have excellent local-anesthetic properties. In comparison with the analogous derivative of 4-aminobenzoic acid, procaine ("Novocain," trade mark of Farbwerke Hoechst), the 4-amino-2-hydroxybenzoic acid-β-diethylaminoethyl ester gives a quicker and more persistent anesthesia, as will be seen from the two tables below:

TABLE 1
[Regnier tests on the rabbit eye]

| Concentration in physiological salt solution, percent | Duration of anesthesia in minutes | |
| --- | --- | --- |
| | p-aminosali-cylic acid diethylamino-ethyl ester chlorhydrate | Procaine chlorhy-drate |
| 0.25 | 0 | 0 |
| 0.50 | 5.5 | 1.2 |
| 1.0 | 12.5 | 10.5 |
| 2.0 | 20.5 | 12.0 |
| 4.0 | 23.5 | 15.0 |

It will be noted that, although the minimum effective concentration is about the same for oxyprocaine and procaine, the duration of anesthesia obtained with oxyprocaine in the usual concentrations is about two times as long as in the case of procaine.

TABLE 2
[Pomphus tests in dogs]

| Concentration in physiological salt solution, percent | Duration of anesthesia in minutes | |
|---|---|---|
| | p-aminosalicylic acid diethylaminoethyl ester chlorhydrate | Procaine chlorhydrate |
| 0.1 | 0 | 0 |
| 0.15 | 13.0 | 7.5 |
| 0.2 | 22.0 | 11.0 |
| 0.5 | | 22.0 |

In the dog tests also, oxyprocaine is at least twice as effective as procaine.

Oxyprocaine is equally superior to procaine when used in combination with vasoconstringents, such as adrenalin or noradrenalin. Kichmann's safety coefficient (ratio of lethal dose to anesthetic threshold) attains a value of 1 in the case of procaine and of 2.4 in the case of oxyprocaine, when 2.5 mg. percent of adrenalin have been added in each case.

Moreover, unlike procaine, oxyprocaine has a bacteriostatic effect. Thus, when used in injections, the excellent local-anesthetic effect is supplemented by a bacteriostatic action which is of particular value in dental surgery (cf. R. Müller, Schweizerische Monatsschrift für Zahnheilkunde, vol. 63, 1953, pp. 376–383; E. Hirsch and W. Holler, Arzneimittelforschung, vol. 2, 1952, pp. 313–314).

The bacteriostatic effect was determined by opacity measurements in the gradation photometer, by germ counts in the Thoma-Zeiss chamber by means of the phase contrast microscope, and by the germ counting method in the agar plate. It was proved that, in opposition to procaine, oxyprocaine showed a definite bacteriostatic effect in the presence of human serum when used in concentrations of 0.5–4.0 percent (service solution).

More of experimental procedure:

To 0.9 cc. of fresh human serum, there was added 0.1 cc. of a 10% solution of either oxyprocaine or procaine in the form of their hydrochlorides. The higher or lower percentage solutions were prepared in a similar manner.

0.5% = 0.95 cc. serum + 0.05 cc. 10% sol. oxyprocaine or procaine
1.0% = 0.90 cc. serum + 0.10 cc. 10% sol. oxyprocaine or procaine
2.0% = 0.80 cc. serum + 0.20 cc. 10% sol. oxyprocaine or procaine
4.0% = 0.60 cc. serum + 0.40 cc. 10% sol. oxyprocaine or procaine.

The solutions thus prepared were incubated for 2 hours. Thereafter, each of the dilutions was inoculated with 0.1 cc. of an 18-hours broth culture of either bacterium coli, staphylococcus aureaus haemolyticus, or Streptococcus haemolyticus Group A. After 24 hours in the incubator, the opacity measurement was carried out in the gradation photometer. Test results were checked against blanks of serum plus bacteria culture which had also been allowed to stand in the incubator for 24 hours, but to which no ester had been added. The opacity (growth of germs in each culture) was measured against the blank in the Pulffrich photometer fitted with blue filter No. 2, the blank being assumed to represent the maximum growth = 100. The test results given below are averages obtained from 25 single tests in each case. There was no difference between the pH-values of the test cultures and those of the blanks.

The results obtained are listed in the following table.

TABLE 3

| Substance | Test germs | Substance concentration | | | |
|---|---|---|---|---|---|
| | | 0.5% | 1% | 2% | 4% |
| | | Number of germs per 10 sq. cm. | | | |
| Oxyprocaine | Staphylococci | 60 | 40 | 7 | 3 |
| Procaine | | 480 | 350 | 240 | 190 |
| Oxyprocaine | Streptococci | 50 | 30 | 7 | 3 |
| Procaine | | 400 | 370 | 220 | 170 |
| Oxyprocaine | Bacteria coli | 25 | 10 | 6 | 2 |
| Procaine | | 500 | 400 | 250 | 180 |

The bacteriostatic effect of oxyprocaine is due to the intermediary formation of p-aminosalicylic acid or m-aminophenol, respectively.

The toxicity of the 4-amino-2-hydroxybenzoic acid-β-diethylaminoethyl ester is somewhat higher than that of procaine (cf. W. Keil and E. Rademacher, Arzneimittel-Forschung, vol. 1, p. 154 et seq., 1951). However, this slight increase in toxicity is of no importance to medical practice where solutions of 2% or 4% are used. When oxyprocaine is used in combination with small quantities of the 4-n-butylamino-2-hydroxybenzoic acid-β-dimethylaminoethyl ester, which is relatively non-toxic as compared to cocaine, anesthesia is considerably deepened and toxicity reduced (cf. W. Holler, Zahnärztliche Welt, vol. 7, No. 12, 1952).

With regard to the anesthetic action, the use of oxyprocaine therefore results in the following advantages over procaine:

(1) Anesthesia sets in more rapidly when using equal amounts of anesthetic.

(2) Anesthesia lasts longer.

(3) Vasoconstringents (e.g., adrenalin) may be added in smaller quantities.

(4) Oxyprocaine is split by esterase into non-toxic split products, one of which, p-aminosalicylic acid, has a bacteriostatic action, while the p-aminobenzoic acid produced in the case of procaine encourages the growth of bacteria.

(5) Undesirable side-effects, especially in inflamed tissues, are reduced.

In combination with penicillin, the esters according to the invention will form sparingly soluble salts. This is particularly true for the diethylaminoethyl, the dipropylaminoethyl, and the piperidinoethyl ester. These salts are about 50% less soluble than the corresponding procaine penicillin salts. As a result, they are naturally able to exert a stronger depositing action when used therapeutically. Furthermore, these salts have a remarkable tuberculostatic action which is almost equal to that of streptomycin (cf. H. Niemesch and W. Stitt, Münchener Medizinische Wochenschrift, 1952, 1418 et seq.; F. Klose and H. Knothe, Ärztliche Wochenschrift, vol. 8, pp. 205–209, 1953; Ernst Rausch, Zietschrift für Orthopädie und ihre Grenzgebiete, vol. 83, No. 1, 1952). In contrast, the procaine salt of penicillin G has no tuberculostatic properties. The tuberculostatic action of the salts is due to the formation of p-aminosalicylic acid or m-aminophenol, respectively, in the physiological splitting process. The dimethylaminoethyl ester of 4-amino-2-hydroxybenzoic acid, when combined with penicillin, has also a strong depositing action and shows a particularly pronounced tuberculostatic effect.

As evidenced by clinical experiences over a period of several years, the diethylaminoethyl ester of 4-amino-2-hydroxybenzoic acid has given excellent results in both dental and surgical operations.

We claim:

1. An acid addition salt of 2-diethylaminoethyl 4-amino-2-hydroxybenzoate.

2. 2-diethylaminoethyl 4-amino-2-hydroxybenzoate monohydrochloride.

References Cited in the file of this patent

UNITED STATES PATENTS

| | | |
|---|---|---|
| 749,982 | Hofmann | July 18, 1905 |
| 820,830 | Stoz et al. | May 15, 1906 |
| 1,676,470 | Adams | July 10, 1928 |
| 2,251,996 | Goldberg | Aug. 12, 1941 |
| 2,727,039 | Clinton et al. | Dec. 15, 1955 |

FOREIGN PATENTS

| | | |
|---|---|---|
| 842,944 | Germany | July 3, 1952 |
| 498,859 | Belgium | Nov. 14, 1950 |
| 722,885 | Great Britain | Feb. 2, 1955 |
| 722,886 | Great Britain | Feb. 2, 1955 |

UNITED STATES PATENT OFFICE
CERTIFICATE OF CORRECTION

Patent No. 3,029,274                          April 10, 1962

Walter Grimme et al.

It is hereby certified that error appears in the above numbered patent requiring correction and that the said Letters Patent should read as corrected below.

Column 2, lines 16 and 17, the formula should appear as shown below instead of as in the patent:

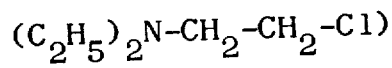

line 44, for "sulfonic" read -- sulfuric --; same column 2, lines 56 and 66, for "salicyclic", each occurrence, read -- salicylic --; column 3, lines 4 and 19, for "p-amino-salicyclic", each occurrence, read - p-aminosalicylic --; line 29, for "p-amino-salicyclic" read -- p-amino-salicylic --; line 45, for "(2decomposition)" read -- (decomposition) --; same column 3, line 50, for "difficulty" read -- difficultly --; column 5, line 25, for "Kichmann's" read -- Kochmann's --; line 45, for "More" read -- Mode --; same column 5, line 62, for "aureaus" read -- aureus --; column 6, line 56, for "H. Niemesch and W. Stitt" read -- H. Niemsch and W. Sitt --; line 57, for "1418" read -- p. 1418 --; line 59, for "Zietschrift" read -- Zeitschrift --; same column 6, line 69, for "experiences" read -- experience --; column 7, line 7, for "Stoz et al." read -- Stolz et al. --.

Signed and sealed this 4th day of September 1962.

(SEAL)
Attest:

ERNEST W. SWIDER

Attesting Officer

DAVID L. LADD

Commissioner of Patents